United States Patent Office 3,422,102
Patented Jan. 14, 1969

---

3,422,102
OMEGA TERTIARY AMINO-1-METHYL ALKYL-4 - PHENYL - 4 - TETRAHYDROPYRAN - 4-CARBOXYLATES
Henri Morren, Forest-Brussels, Belgium, assignor to UCB (Union Chimique-Chemische Bedrijven) Saint-Gilleslez, Brussells, Belgium
No Drawing. Continuation of application 400,914, Oct. 1, 1964. This application Apr. 27, 1967, Ser. No. 634,389
Claims priority, application Great Britain, Oct. 4, 1963, 39,208/63
U.S. Cl. 260—247.2     5 Claims
Int. Cl. C07d 99/04; C07d 5/04

ABSTRACT OF THE DISCLOSURE

A compound selected from the group consisting of:
(a) The esters of secondary amino-alcohols of the formula:

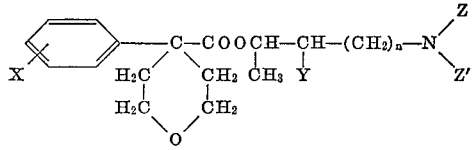

in which X is selected from the group consisting of hydrogen, chlorine, lower alkyl and lower alkoxy, Y is selected from the group consisting of hydrogen and methyl, Z and Z' taken separately each represents a member selected from the group consisting of hydrogen and lower alkyl and taken together with the adjacent nitrogen atom represent a member selected from the group consisting of morpholino and piperidino, and $n$ is an integer of from 0 to 4; and
(b) The acid addition salts thereof. The esters of this invention have marked antitussive activity.

SUMMARY OF THE INVENTION

The present invention relates to new and useful esters of secondary amino-alcohols and to the preparation thereof.

These new esters are compounds of the general formula:

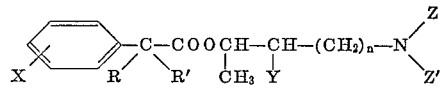

in which X is a hydrogen or halogen atom or an alkyl, alkoxy, carbalkoxy, amino or alkylcarbamyl radical, Y is a hydrogen atom or an alkyl radical, Z and Z', which may be the same or different, are hydrogen atoms or lower alkyl radical or, together with a nitrogen atom form a heterocyclic ring which may contain other hereto atoms such as oxygen, R and R', which may be the same or different, are lower alkyl radicals or, together with the carbon atom in the alpha-position to the —COO—group, form a carbocyclic or heterocyclic ring and $n$ is 0, 1, 2, 3 or 4; and the acid addition salts thereof with inorganic or organic acids.

We have found that the esters of the above general formula possess interesting therapeutic properties and, in particular, a noteworthy anti-tussive activity in R. Engelhorn's test (Arzneimittel Forschung, 10 (1960), 785–794) based on the mechanical stimulation of the trachea of an anaesthetized cat. Thus, in this test, 3-(N-diethylamino)-1-methyl-propyl 4-phenyl-tetrahydropyran-4-carboxylate hydrochloride (Example 1) and 4-(N-diethylamine)-1-methyl-butyl 4-phenyl - tetrahydropyran-4-carboxylate citrate (Example 2) have activities which are equal to and greater than that of codeine, respectively.

The compounds of the present invention can be prepared by the conventional methods used for the production of amino-esters particularly by the reaction of an alcohol of the formula:

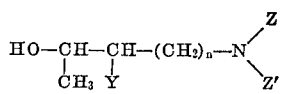

wherein Y, Z, Z' and $n$ are described above with a carbonyl chloride having the formula:

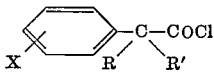

wherein X, R and R' are described above.

The carboxylic acid chlorides used for the preparation of the compounds according to the present invention are obtained from the corresponding acids. Thus, the 4-(X-phenyl)-tetrahydropyran-4-carbonyl chlorides (X being described above) used for the preparation of some of the compounds according to the present invention are obtained by reacting the corresponding acids with thionyl chloride. These acids themselves are synthesized from the corresponding nitriles by conventional methods. These nitriles, i.e. the 4-cyano-4-(X-phenyl)-tetrahydropyrans, are prepared by the method described by O. Eisleb (Berichte deut, chem. Ges. 74 (1941), 1447) by the condensation of the corresponding phenyl-acetonitrile with bis-(2-chloroethyl)-ether in the presence of sodamide. The equation given below illustrates the different stages of the synthesis of 4-(X-phenyl)-tetrahydropyran-4-carbonyl chloride used for the preparation of some of the aminoesters of the present invention:

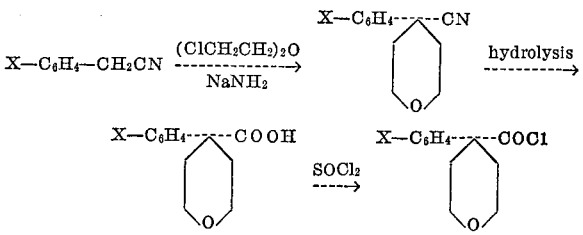

In view of the fact that the products of the present invention are basic, use may be made of their water-soluble salts for their isolation and/or purification and also for the preparation of their administratable aqueous solution. It is obvious that only the salts formed from pharmaceutically-acceptable acids may be used for therapeutical applications. Such acids are well known in the art and include, for example, hydrochloric, hydrobromic, sulfuric, nitric, phosphoric, benzenesulphonic, citric, maleic acids and the like. These satls may be prepared by known methods, for example by reacting the basic compound with an equivalent of the selected acid in alcoholic solution. Other processes may also be used.

The following examples are given for the purpose of illustrating the present invention:

Example 1.—3-(N-diethylamino)-1-methyl-propyl-4-phenyl-tetrahydropyran-4-carboxylate

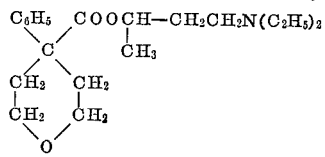

78.7 g. of 4-phenyl-tetrahydropyran14-carbonyl chloride and 50.7 g. of 4-(N-diethylamino)-butan-2-ol are heated under reflux for 5 hours in 200 ml. of anhydrous toluene. The reaction mixture is cooled and then 200 ml. of water and 150 ml. of a 10% aqueous sodium hydroxide solution are added thereto. The organic layer is decanted and washed three times, using 100 ml. of water each time. The organic layer is dried over anhydrous sodium sulfate, the solvent is evaporated and the residue is distilled under reduced pressure. In this way, 97.5 g. of 3-(N-diethylamino)-1-methyl-propyl 4-phenyl-tetrahydropyran-4-carboxylate are obtained. Boiling point: 150° C./0.1 mm. Hg. Yield: 83.7%.

The ester thus obtained is converted into its hydrochloride by dissolving it in isopropyl alcohol and treating the alcoholic solution with a slight excess of an etheral solution of hydrochloric acid. Melting point of the hydrochloride: 136° C. Melting point of the citrate obtained by the conventional method in an ethanol-ether mixture: 108–110° C.

Example 2.—4-(N-diethylamino)-1-methyl-butyl 4-phenyl-tetrahydropyran-4-carboxylate

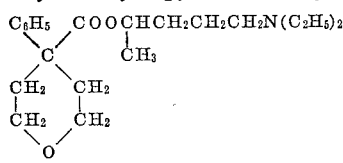

A mixture of 22.4 g. of 4-phenyl-tetrahydropyran-4-carbonyl chloride and 15.9 g. of 5-(N-diethylamino)-pentan-2-ol- in 100 ml. of anhydrous toluene are heated under reflux for 5 hours.

The reaction mixture is cooled and then 100 ml. of water and 50 ml. of a 10% aqueous sodium hydroxide solution are added thereto. The toluene layer is decanted and washed three times, using 100 ml. of water each time. The toluene layer is dried over anhydrous sodium sulfate and evaporated to dryness.

The residue is dissolved in 50 ml. of ethanol and a hot solution of 19.2 g. of citric acid in 100 ml. of ethanol are added thereto. The mixture is cooled and a small quantity of ethyl ether added. 4-(N-diethylamino)-1-methyl-butyl 4- phenyl-tetrahydropyran-4-carboxylate citrate crystallizes out. 38.5 g. of this compound having a melting point of 100° C. (not to sharp), are obtained.

The esters of the following secondary amino-alcohols are prepared in the same manner:

2-(N-diethylamino)-1-methyl-ethyl 4-phenyl-tetrahydropyran-4-carboxylate. Melting point of the hydrochloride: 172–73° C. (cryst. from an isopropyl alcohol-ether mixture).

2-(N-diethylamino)-1-methyl-ethyl 4-p-chlorophenyl-tetrahydropyran-4-carboxylate. Boiling point of the base: 170° C./0.5 mm. Hg.

3-(N-dimethylamino)-1-methyl-propyl 4-phenyl-tetrahydropyran-4-carboxylate. Boiling point of the base: 142° C./0.001 mm. Hg.

3-(N-dimethylamino)-1-methyl-propyl 4-o-methylphenyl-tetrahydropyran-4-carboxylate. Melting point of the hydrochloride: 154° C. (cryst. from acetone).

3-(N - diethylamino)-1-methyl - propyl 4-p-chlorophenyl-tetrahydropyran-4-carboxylate. Melting point of the hydrochloride: 146° C. (cryst. from an isopropyl alcohol-ether mixture).

3-(N-diethylamino)-1-methyl-propyl 4-p-methoxyphenyl-tetrahydropyran-4-carboxylate. Melting point of the citrate: 103° C. (cryst. from an ethanol-ether mixture).

3-(N-diisopropylamino)-1-methyl-propyl 4-phenyl-tetrahydropyran-4-carboxylate. Boiling point of the base: 135–37° C./0.001 mm. Hg.

3-(N-diethylamino)-1,2-dimethyl-propyl 4-phenyl-tetrahydropyran-4-carboxylate. Boiling point of the base: 152° C./0.01 mm. Hg.

Melting point of the hydrochloride: 126° C. (cryst. from acetone).

3-morpholino-1-methyl-propyl 4-phenyl-tetrahydropyran-4-carboxylate. Melting point of the hydrochloride: 148–49° C. (cryst. from a toluene-ether mixture).

3-piperidino-1-methyl-propyl 4-phenyl-tetrahydropyran-4-carboxylate. Boiling point of the base: 160° C./0.1 mm. Hg. Melting point of the citrate: 86° C. (cryst. from an ethanol-ether-mixture).

3-(N-diethylamino)-1-methyl-propyl 4-phenyl-tetrahydrothiapyran-4-carboxylate. Melting point of the hydrochloride: 156° C. (cryst. from toluene).

4-(N-diethylamino)-1-methyl-butyl 4-phenyl-tetrahydrothiapyran-4-carboxylate. Melting point of the hydrochloride: 154° C. (cryst. from toluene).

3-(N-diethylamino)-1-methyl-propyl 1-phenyl-cyclohexane-1-carboxylate. Melting point of the hydrochloride: 142° C. (cryst. from an isopropyl alcohol-ether mixture).

3-(N-diethylamino)-1-methyl-propyl 1-methyl-4-phenyl-piperidine-4-carboxylate. Boiling point of the base: 140° C./0.005 mm. Hg. Melting point of the dicitrate: 107° C. (cryst. from ethanol).

3-(N-diethylamino)-methyl-propyl 2-ethyl-2-phenyl-butanoate. Melting point of the citrate: 121° C. (cryst. from ethanol).

The following new intermediates, used for the preparation of some of the amino-esters of the present invention, have also been prepared:

4-cyano-4-p-chlorophenyl-tetrahydropyran (boiling point: 137–140° C./1 mm. Hg).

4-p-chlorophenyl-tetrahydropyran-4-carboxylic acid.

4-p - chlorophenyl - tetrahydropyran-4-carbonyl chloride (boiling point: 145° C./0.2 mm Hg).

4-cyano-4-methyl phenyl-tetrahydropyran (boiling point 124–25° C./0.01 mm. Hg).

4-o - methylphenyl - tetrahydropyran - 4 - carboxylic acid (melting point: 160–62° C.).

4 - o - methylphenyl - tetrahydropyran-4-carbonyl chloride (boiling point 170° C./15 mm. Hg).

4-cyano-4 - p - methoxyphenyl - tetrahydropyran (boiling point: 130° C./0.15 mm. Hg).

4-p-methoxyphenyl-tetrahydropyran-4-carboxylic acid.

4-p-methoxyphenyl-tetrahydropyran-4-carbonyl chloride.

What is claimed is:

1. 3-(N-diethylamino)-1-methyl-propyl 4-phenyltetrahydropyran-4-carboxylate or the pharmaceutically acceptable acid addition salts thereof.

2. 4-(N-diethylamino)1-methyl-butyl 4-phenyl - tetrahydropyran-4-carboxylate or the pharmaceutically acceptable acid addition salts thereof.

3. 3 - (N - diethylamino)-1-methyl-propyl-4-p-chlorophenyl-tetrahydropyran-4-carboxylate or the pharmaceutically acceptable acid addition salts thereof.

4. 3 - (N-diethylamino)-1,2-dimethyl-propyl 4-phenyl-tetrahydropyran-4-carboxylate or the pharmaceutically acceptable acid addition salts thereof.

5. 3-morpholino-1-methyl-propyl 4 - phenyltetrahydropyran-4-carboxylate or the pharmaceutically acceptable acid addition salts thereof.

References Cited

Fleish et al.: Chemical Abstracts, vol. 57, pp. 8542–43 (1962).

ALTON D. ROLLINS, Primary Examiner.

JOSE TOVAR, Assistant Examiner.

U.S. Cl. X.R.

260—345.8, 294.3, 477, 999